(12) United States Patent
Martensson et al.

(10) Patent No.: US 12,326,098 B2
(45) Date of Patent: Jun. 10, 2025

(54) COMPRESSOR BLADE

(71) Applicant: GKN Aerospace Sweden AB, Trollhättan (SE)

(72) Inventors: Hans Martensson, Trollhättan (SE); Lars Ellbrant, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 0 days.

(21) Appl. No.: 17/795,042

(22) PCT Filed: Feb. 11, 2021

(86) PCT No.: PCT/EP2021/053383
§ 371 (c)(1),
(2) Date: Jul. 25, 2022

(87) PCT Pub. No.: WO2021/160762
PCT Pub. Date: Aug. 19, 2021

(65) Prior Publication Data
US 2023/0051249 A1  Feb. 16, 2023

(30) Foreign Application Priority Data

Feb. 11, 2020 (GB) ...................................... 2001831

(51) Int. Cl.
*F01D 5/14* (2006.01)
(52) U.S. Cl.
CPC ........ *F01D 5/141* (2013.01); *F05D 2240/305* (2013.01)

(58) Field of Classification Search
CPC .............. F01D 5/141; F05D 2240/305; F05D 2240/304; F05D 2240/307; F05D 2250/184; F05D 2250/185; F05D 2250/611; F04D 29/324; Y02T 50/60
See application file for complete search history.

(56) References Cited

U.S. PATENT DOCUMENTS

| | | | |
|---|---|---|---|
| 4,786,016 A | | 11/1988 | Presz, Jr. et al. |
| 4,813,633 A | * | 3/1989 | Werle ...................... B64C 23/00 416/235 |
| 4,830,315 A | * | 5/1989 | Presz, Jr. ................ F01D 5/141 244/130 |
| 4,858,852 A | | 8/1989 | Henne et al. |
| 5,151,014 A | | 9/1992 | Greenwald et al. |
| 11,795,823 B2 | * | 10/2023 | Furukawa ............. F04D 29/384 |

(Continued)

FOREIGN PATENT DOCUMENTS

CA   2008744 C  *  3/2000  ............. B23P 6/002

OTHER PUBLICATIONS

International Search Report and Written Opinion for PCT/EP2021/053383 mailed Apr. 30, 2021 (10 pages).

(Continued)

*Primary Examiner* — Aaron R Eastman
(74) *Attorney, Agent, or Firm* — Sheppard Mullin Richter & Hampton LLP

(57) ABSTRACT

The disclosure concerns a compressor blade for gas turbine engine. Specifically the blades of the compressor are modified according to predetermined requirements for both aerodynamic stability and fuel economy in multiple planes.

18 Claims, 11 Drawing Sheets

(56) References Cited

U.S. PATENT DOCUMENTS

| | | | | |
|---|---|---|---|---|
| 2003/0152459 | A1* | 8/2003 | Gliebe | F01D 5/141 |
| | | | | 415/211.2 |
| 2006/0263222 | A1 | 11/2006 | Vetters | |
| 2009/0013532 | A1* | 1/2009 | Wood | F04D 29/324 |
| | | | | 29/889.7 |
| 2010/0322774 | A1* | 12/2010 | Morrison | F01D 5/141 |
| | | | | 416/223 A |
| 2011/0200442 | A1* | 8/2011 | Routier | F01D 5/145 |
| | | | | 416/223 A |
| 2011/0217170 | A1* | 9/2011 | Buffone | B64C 11/20 |
| | | | | 416/128 |
| 2011/0293422 | A1* | 12/2011 | Gupta | F01D 5/145 |
| | | | | 416/95 |
| 2016/0230561 | A1* | 8/2016 | Duong | F01D 5/145 |
| 2016/0290648 | A1* | 10/2016 | Loeffel | F23R 3/283 |
| 2018/0023400 | A1* | 1/2018 | Jones | F01D 5/187 |
| | | | | 415/115 |
| 2020/0148325 | A1* | 5/2020 | Gea Aguilera | F01D 5/145 |
| 2020/0173284 | A1* | 6/2020 | Gauss | F04D 29/281 |
| 2020/0173458 | A1* | 6/2020 | Uffelman | F04D 29/681 |

OTHER PUBLICATIONS

UKIPO Combined Search and Examination Report under Sections 17 and 18(3) (6 pages).

\* cited by examiner

COMPRESSOR BLADE

CROSS-REFERENCE TO RELATED APPLICATIONS

This application is a national stage of, and claims priority to, Patent Cooperation Treaty Application No. PCT/EP2021/053383, filed on Feb. 11, 2021, which application claims priority to Great Britain Application No. GB 2001831.3, filed on Feb. 11, 2020, which applications are hereby incorporated herein by reference in their entireties.

BACKGROUND

A typical gas turbine engine comprises a pair of compressors, namely a first upstream low pressure compressor and a second, downstream, high pressure compressor. The pair of compressors compress air entering the engine in two-stages before the compressed gas is communicated into the combustors where fuel is introduced and the mixture ignited. The operation of a gas turbine engine is well known to a person skilled in the art.

Two key performance requirements for compressor blades are high efficiency at one operating point (normally the cruise speed of the engine) and high stability across the entire working speed of the engine. The high efficiency is crucial to meet the engine specific fuel consumption target of the engine while high stability is needed to ensure safe operation at all flight conditions. These two requirements are typically in clear conflict, meaning that the designer needs to sacrifice efficiency in order to obtain sufficient stability within the compressor (stability meaning airflow and vibrational stability). In effect, a compromise is made between ensuring the safe operation of the engine at all engine speeds and achieving the best possible fuel economy.

A problem with gas turbine engine operation and design is that the engines operate at very varied speeds. For example, on taxi or waiting to take-off the engine will operate at relatively low speeds i.e., parts of the compressor will be travelling at sub-sonic speeds (much less than 450 ms$^{-1}$). In contrast, during a climb or at cruise, the engine speed is significantly higher i.e., parts of the compressor will be travelling at near super-sonic speeds (at or approaching 450 ms$^{-1}$).

Achieving the compromise in compressor blade design additionally frequently requires other modifications to the engine. For example, the blade shapes are designed to meet the efficiency target while high stability is obtained by introducing techniques such as variable guide vanes and air bleed. These techniques allow air to be prevented from entering the compressor at low speeds to prevent engine stall for example. These techniques also allow engines to be built that maintain stability and achieve accepted levels of fuel consumption.

However, although effective in allowing for engine design, both these techniques add weight and complexity to the engine which in turn increases the product cost and increases fuel consumption.

The present disclosure sets forth a surprising alternative approach to compressor blade design which allows efficiency and stability to be realised simultaneously and furthermore presents the possibility to dispense with variable guide vanes and air bleed arrangements in a gas turbine engine. This can significantly improve the maintenance schedules of engines.

SUMMARY OF THE INVENTION

The present disclosure is concerned with an improved compressor blade arrangement. For example, but not exclusively, the disclosure is concerned with a compressor blade for use in a low pressure compressor (LPC) and/or a high pressure compressor (HPC). Aspects are set out below and in the accompanying claims.

Viewed from a first aspect of the present disclosure, there is provided a compressor blade, for a compressor comprising a plurality of blades, each blade extending radially from a central hub and comprising a pressure surface on one side of the blade and a suction surface on an opposing side of the blade, wherein the pressure surface and suction surface extend from a common leading edge of a blade to a suction surface trailing edge and a pressure surface trailing edge, and wherein the trailing edges of the pressure surface and suction surface of the blade are joined by a third trailing edge surface.

The present disclosure provides a novel approach to compressor blade shape. The strategy is to design the suction side of the blade on the basis of obtaining high efficiency at the design point while the pressure side of the blade is designed on the basis of obtaining high stability aerodynamics. These two parameters are implemented in the blade design simultaneously which is counterintuitive in blade design.

In conventional blade design the designer must select a compromise blade configuration which either compromises in the area of efficiency or in the stability of the blade or in both. Designers have achieved operable blades within these constraints but fully optimised blade designs with simultaneous and independent optimisation has not previously been possible.

The present disclosure sets forth a counterintuitive and inherently different blade construction. According to this strategy of simultaneous and independent optimisation of blade performance, the trailing edge of the blade becomes thicker than conventional blades i.e., the trailing edge surface that connects the trailing edge of the pressure surface and the trailing edge of the suction surface at the 'downstream' end of the blade. This thicker blade is inherently undesirable because it will introduce additional losses due to vortex shedding from the trailing edge.

However, according to the present disclosure, a thicker trailing edge surface is maintained and have the issue of vortex generation is addressed. Specifically, the dual optimised blade comprises a modified trailing edge that in one arrangement is shaped in a sinusoidal pattern that advantageously controls the shedding and thus minimizes losses.

In effect the pressure surface is the surface that is facing the flow "first" when the blade rotates, while the suction surface is the "backward facing" surface.

A fully optimised blade for both stability and efficiency at cruise and other operating conditions can thus be realised.

The third trailing edge surface is the surface that defines the aft surface of the blade. In a conventional blade the trailing edges of the suction and pressure surfaces are contoured or tapered together to define a single smooth surface at which the two surfaces meet.

According to the present disclosure, the third trailing edge surface is not a single line or edge but is instead a surface in its own right having a boundary defined between the hub of a blade to a tip of the blade and from the trailing edge of the pressure surface to the trailing edge of the suction surface.

Advantageously the blade profiles of pressure and suction surfaces can be optimised for overall engine performance without compromise. Thus, the surface profile of the pressure surface of the blade may be shaped according to a predetermined profile providing, in use, a predetermined aerodynamic stability. Additionally, and simultaneously, the surface profile of the suction surface of the blade may be shaped according to a predetermined profile providing, in use, a predetermined fuel efficiency. Thus, both desired profiles can be accommodated without compromise.

For clarity, as stated above, the pressure surface is always the surface that is facing the flow "first" when the blade rotates, while the suction surface is the "backward facing" surface.

The length of the suction surface measured from the leading edge to the suction surface trailing edge may be greater than the length of the pressure surface measured from the leading edge to the pressure surface trailing edge. This allows for greater curvature of one surface relative to the other and allows for optimisation of the two surfaces independently.

The third trailing edge surface may have a uniform thickness measured in a circumferential direction between the trailing edge of the suction side and the trailing edge of the pressure side. In such an arrangement, the width of the third trailing surface (the aft surface of the blade) measured in a circumferential direction is generally constant along the radial extent of the blade.

The leading edge of the pressure surface may intersect smoothly with the leading edge of the suction surface to define a smooth curved leading edge surface of the blade. Thus, air impinging on the blade is smoothly divided over the two sides of the blade and towards the two trailing edges of suction and pressure surfaces.

The pressure surface extending from the smooth leading edge may advantageously have a curvature to cause air to leave the pressure surface trailing edge in a first direction; and the suction surface extending from the smooth leading edge may have a curvature to cause air to leave the suction surface trailing edge in a second direction. In effect air leaving the trailing part of the blade may comprise two different airflows; each with a slightly different direction by virtue of the curvature of the pressure and suction surfaces.

As described above, the curvatures of each surface are selected according to different and independent operational requirements which result in two independent directions of airflow from the aft or trailing surfaces of the blade.

The difference in direction will be dependent on the difference in the necessary airflow curvatures of the pressure and suction surfaces but may be separated by a predetermined angle depending on the operating characteristics of the engine.

Advantageously, a portion of the third trailing edge surface of the blade alternates between a first circumferential direction and a second opposing circumferential direction when measured along the radius of the blade. In effect a serpentine profile of the third trailing surface is provided. Specifically, as opposed to having two straight sides each side of the third surface undulates left and right from or proximate to the hub and to or proximate to the tip of the blade.

In one example, a portion of the third trailing edge surface may have a sinusoidal profile when measured along the radius of the blade. The sinusoidal profile may have a predetermined amplitude and frequency according to the design requirements needed to shed vortices at specific frequencies as described herein.

The undulating or sinusoidal shape may be uniform along the blade from hub to tip. Alternatively, and advantageously, the third trailing edge profile may comprise:
  (i) a first substantially straight portion extending radially from the hub; and
  (ii) a second alternating portion extending from the intersection of the first and second portions towards the tip of the blade.

Thus, the third trailing surface may be divided into multiple zones with different surface profiles or geometry changing from a portion of the blade closer to the hub and to a portion of the blade closer to the tip.

The location of the change in profile of the third surface may be selected according to design requirements. For example, the intersection of the first and second portions may be at a predetermined radius measured from the hub of the blade.

Specifically, the predetermined radius may correspond to a radius at which the airflow speed at the leading edge of the blade exceeds approximately Mach 1 when the compressor is operating at its normal cruise condition. In this context, the term 'cruise' is intended to refer to the operating state of the engine when the aircraft is at normal cruise speed and altitude. The reason to apply the present disclosure above this radius is due to the fact that the design challenge of balancing the cruise and part speed operating point is at its greatest when the incoming flow is supersonic. In effect it is beneficial for the undulation of the blade to commence at a position when incoming airflow over the blade exceeds Mach 1 (at cruise).

The undulations of the profile may, as described above, be determined based on the anticipated operating conditions of the engine and may be determined with industry standard fluid mechanic and finite element analysis equipment. This will allow the amplitude and frequency of the sine or undulating profile to be determined to optimise the vortex damping effect.

In one example, the undulating profile of the sine shape may be uniform in amplitude measured from a datum passing radially outwards along the blade. In another example, the undulating profile may be non-uniform in amplitude measured from a datum passing radially outwards along the blade.

For example, the frequency of undulations may be uniform measured radially outwards along the blade or the frequency of undulations may be non-uniform measured radially outwards along the blade.

The surface of the third trailing edge may, in one example, be substantially flat or planar. In another arrangement the surface may be all or in part convex and/or concave to cause three-dimensional vortex shedding and damping from the surface.

Viewed from another aspect there is provided a method of manufacturing a compressor blade as described herein.

Viewed from another aspect of the present disclosure, described herein there is provided a compressor blade for a compressor comprising a plurality of blades, each blade extending radially from a central hub and comprising a pressure surface on one side of the blade and a suction surface on an opposing side of the blade, wherein the pressure surface and suction surface extend from a common leading edge of a blade to a suction surface trailing edge and a pressure surface trailing edge, and wherein the trailing edges of the pressure surface and suction surface intersect to form a single trailing edge and wherein a portion of the intersecting trailing edges have a circumferentially oscillating profile extending radially along the blade.

Viewed from a still further aspect there is provided a gas turbine engine comprising a compressor, said compressor comprising a compressor blade according to the disclosure herein. Viewed from another aspect there is provided an aircraft comprising one or more engines incorporating a blade described herein.

Viewed from yet another aspect there is provided a method of manufacturing a blade for a compressor having a plurality of blades, wherein each blade is arranged to extend radially from a central hub and comprising a pressure surface on one side of the blade and a suction surface on an opposing side of the blade, wherein the pressure surface and suction surface extend from a common leading edge of a blade to a suction surface trailing edge and a pressure surface trailing edge, and wherein the trailing edges of the pressure surface and suction surface of the blade are joined by a third trailing edge surface The method of manufacture may be implemented using conventional machining techniques, for example computer numerically controlled machining centres which can machine complex three dimensional shapes such as blade profiles.

Alternatively, a blade may be manufactured using an additive manufacturing technique.

Various additive manufacturing techniques could be used to create the profiles and to apply the surface modifications of the present disclosure. In fact the geometries make additive manufacture particularly appropriate since complex internal geometries and surface finishes can be created without the need for access by grinding or polishing tooling.

The term additive manufacture is intended to refer to a technique where the blades are created layer by layer until the complete blade or hub and blade structure is formed.

Examples of additive manufacturing technique which could conveniently be used include powder bed techniques such as electron beam welding, selective laser melting, selective laser sintering or direct metal laser sintering. Alternative technique may include wire fed processes such as electron beam forming.

Aspects of the disclosure extend to methods of using additive manufacture for forming a structure described herein.

DRAWINGS

Aspects of the disclosure will now be described, by way of example only, with reference to the accompanying figures in which.

Figure 6A:
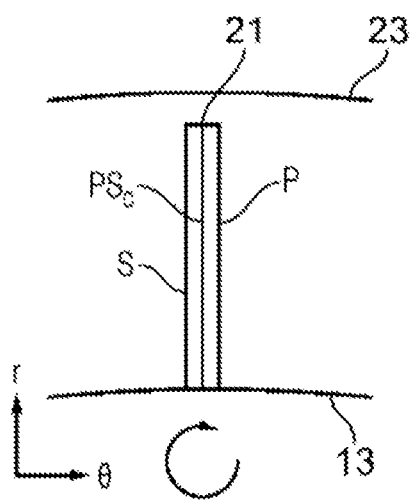
Figure 6B:
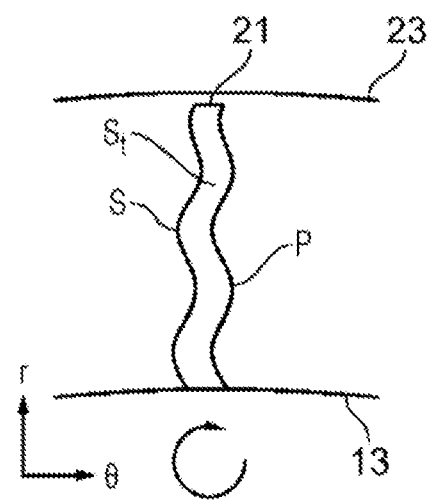
Figure 6C:
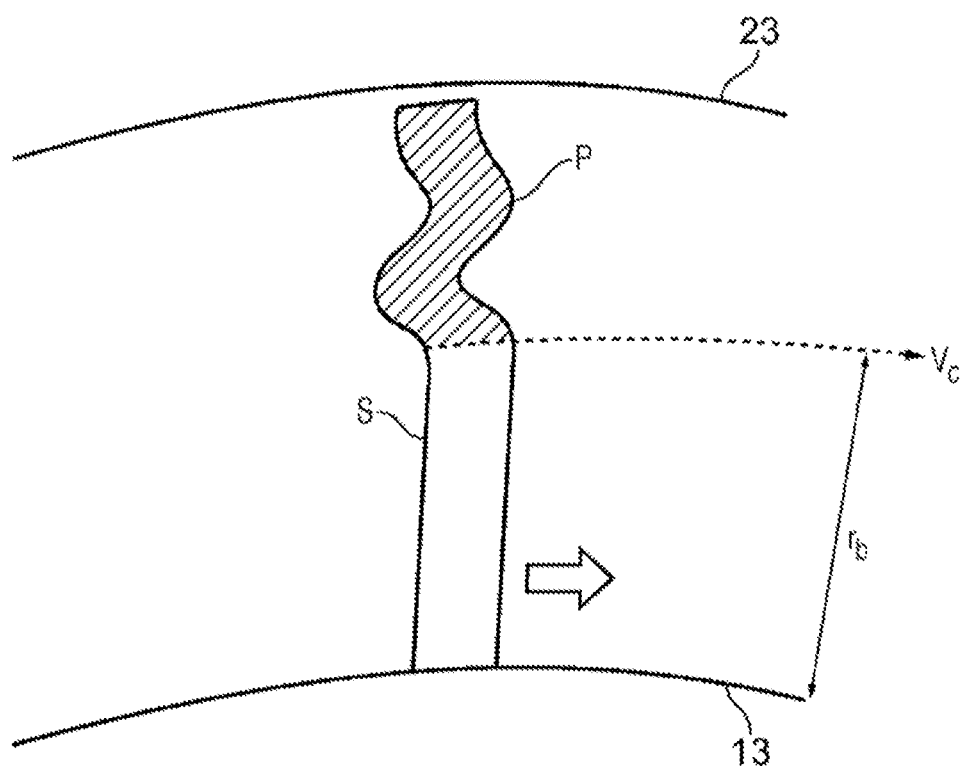

FIGS. 6A-C show a conventional compressor blade and two example arrangements of a modified compressor blade as described herein.

Figure 7:
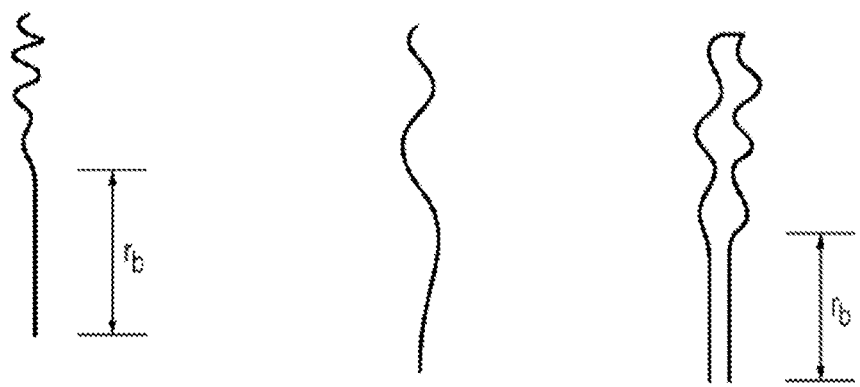
Figure 8:
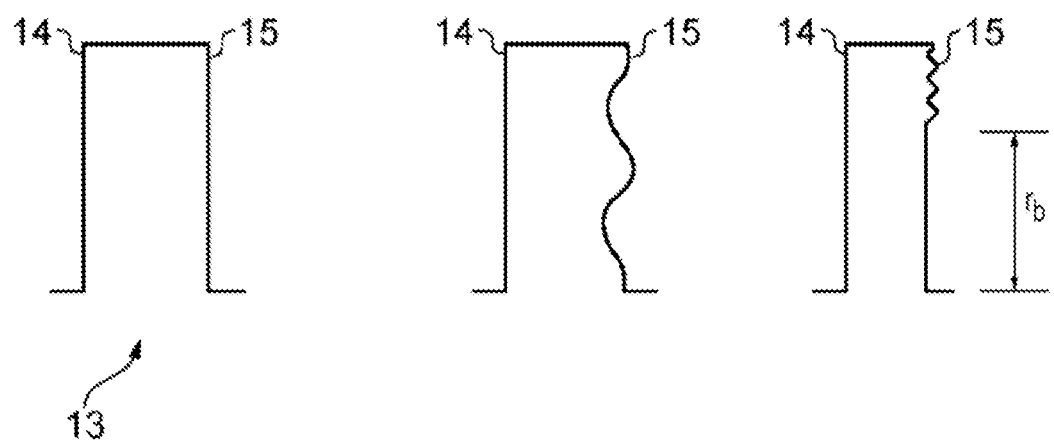
Figure 9A:
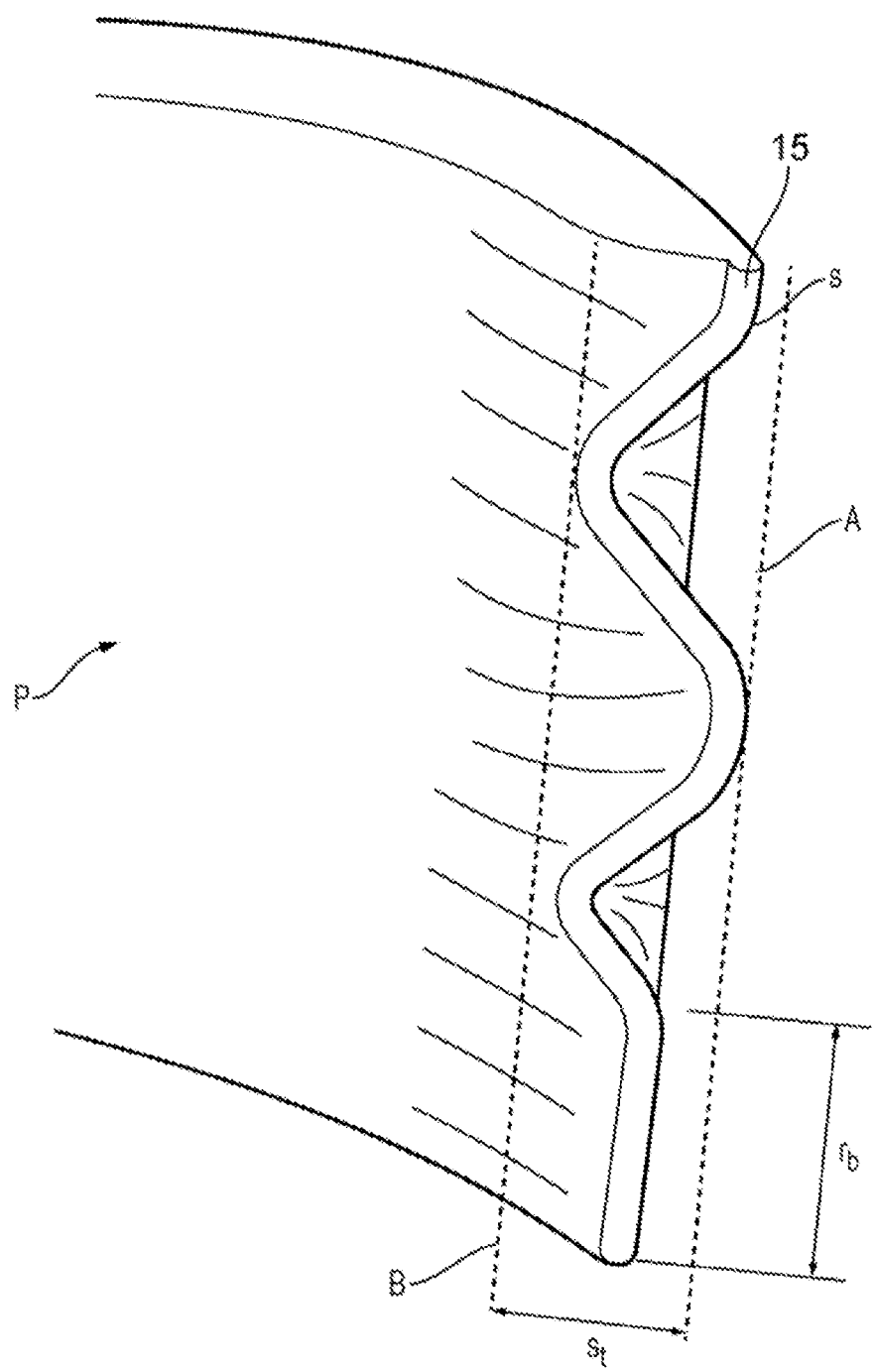
Figure 9B:
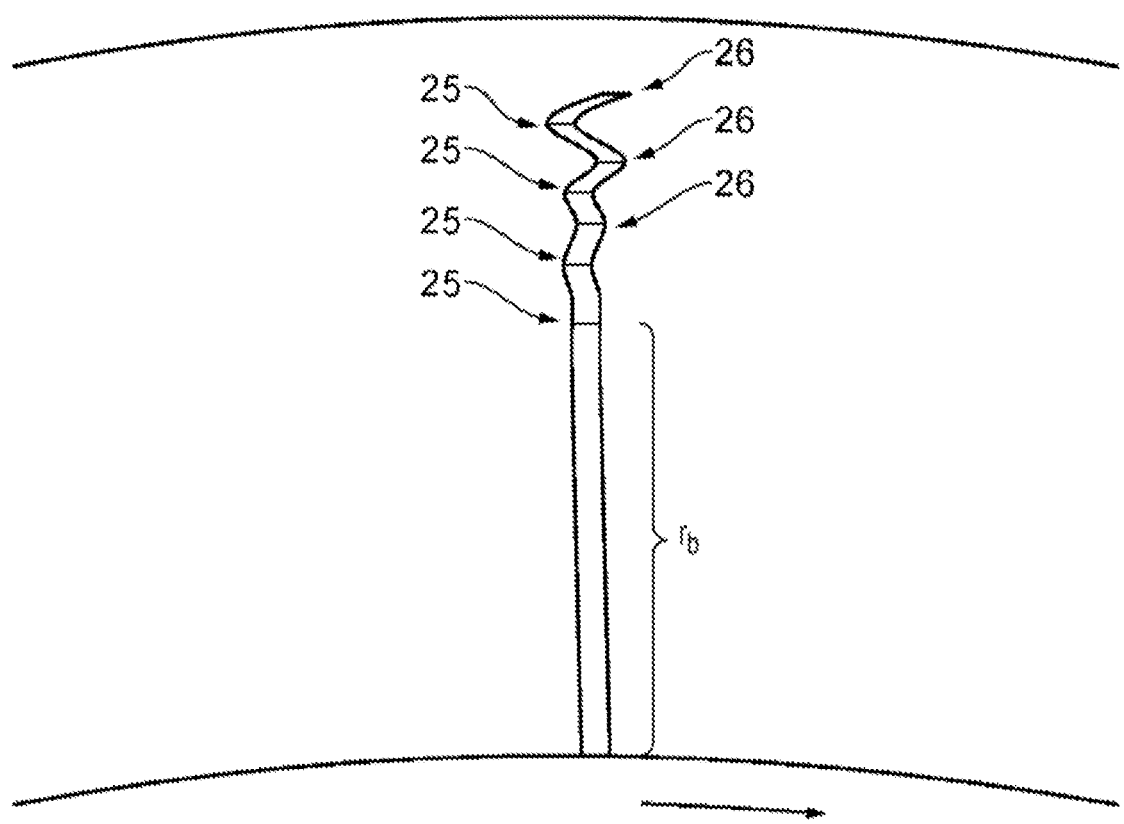
Figure 10A:
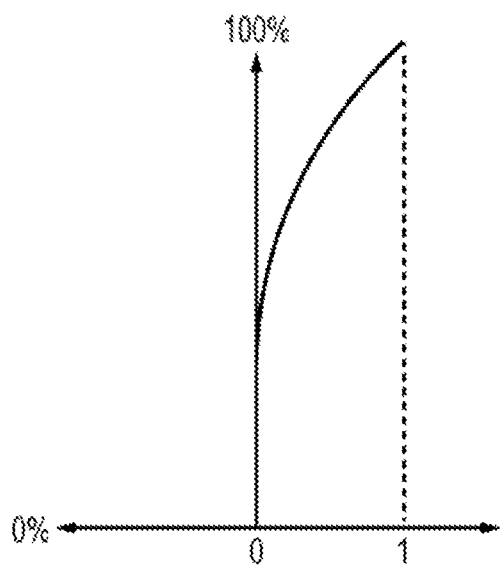
Figure 10B:
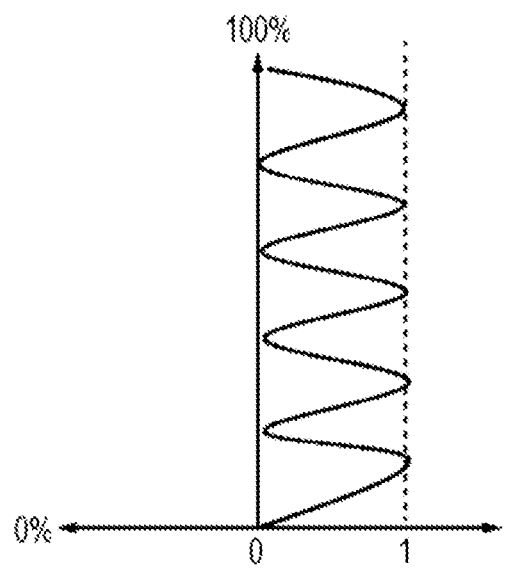

FIG. 7 shows alternative trailing edge profiles of compressor blades described herein viewed in an axial direction of a compressor;

FIG. 8 shows alternative trailing edge profiles of compressor blades described herein viewed in a circumferential direction of a compressor;

FIGS. 9A and 9B show a perspective view of the duct profile illustrating the geometry of the duct; and FIGS. 10A and 10B show example blending functions that can be used to combine one blade with high efficiency with one blade with high stability.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope defined by the appended claims.

As used in this specification, the words "comprises", "comprising", and similar words, are not to be interpreted in an exclusive or exhaustive sense. In other words, they are intended to mean "including, but not limited to".

It will be recognised that the features of the aspects of the invention(s) described and claimed herein can conveniently and interchangeably be used in any suitable combination. It will also be recognised that the disclosure covers not only individual embodiments but also combinations of the embodiments that have been discussed herein.

DETAILED DESCRIPTION

Figure 1:
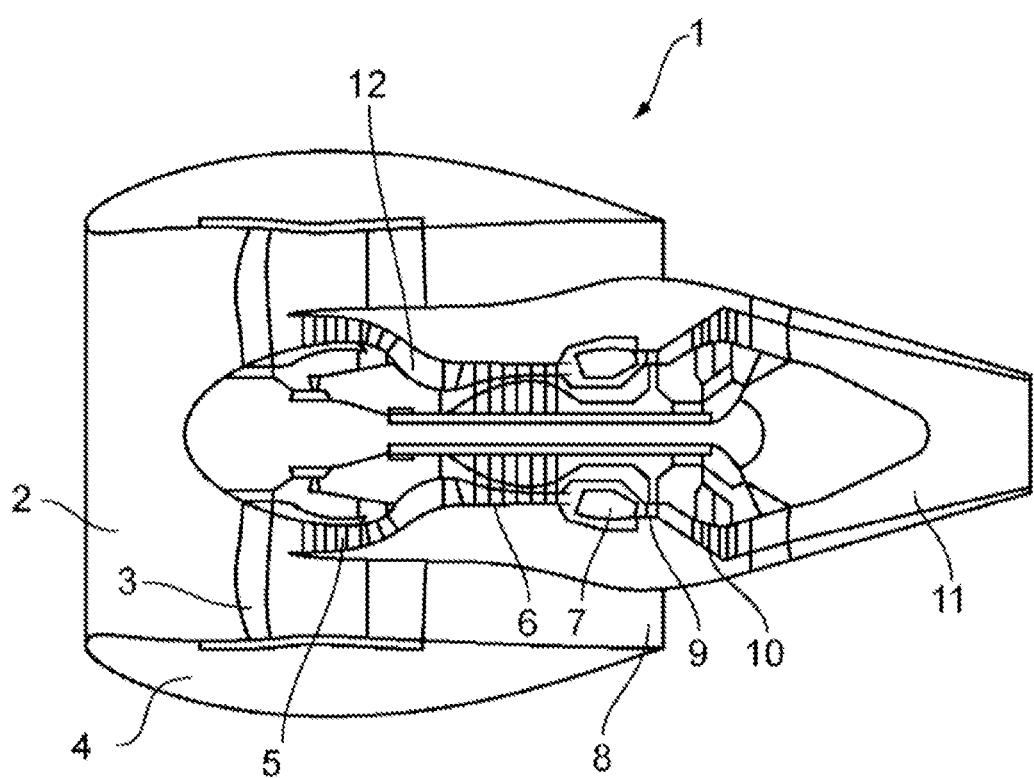
FIG. 1 shows a cross-section of a gas turbine engine incorporating a compressor.

FIG. 1 shows a cross-section of a gas turbine engine 1 which may incorporate a compressor blade as described in detail below.

The skilled person will understand the principal components of a gas turbine engine and their operation. In summary the engine 1 comprises an air intake 2 which permits air to flow into the engine to the fan 3 located at the upstream end of the engine. All of the components are housed within the engine nacelle 4.

The engine comprises a bypass channel downstream of the fan and a central engine core which contains the compressors, combustors, and turbines. The core of the engine is formed of a first low pressure compressor (LPC) 5 and a second high pressure compressor (HPC) 6. This multi-stage compressor arrangement takes air from ambient pressure and temperature and compresses the air to high temperature and pressure. Compressed air is then communicated to the combustion chamber 7 where fuel is injected and combustion occurs.

The combustion gases are expelled from the rear of the combustions chamber 7 and impinge first on a high pressure turbine 9 and then on a second low pressure turbine 10 before leaving the rear of the engine through the core nozzle 11. Thrust from the engine is created by two gas flows: a first from the fan nozzle 8 (receiving thrust from the fan) and secondly from the exhaust gases from the core nozzle 11.

The present disclosure is concerned with the blades that are found in both the low pressure compressor 5 and high pressure compressor 6.

Each compressor comprises a series of rows of compressor blades, each series coupled to a central shaft through a hub. By adjusting the spacing of consecutive blades it is possible to increase the compression ratio along the compressor. as will be understood by a person skilled in compressor design.

Figure 2:
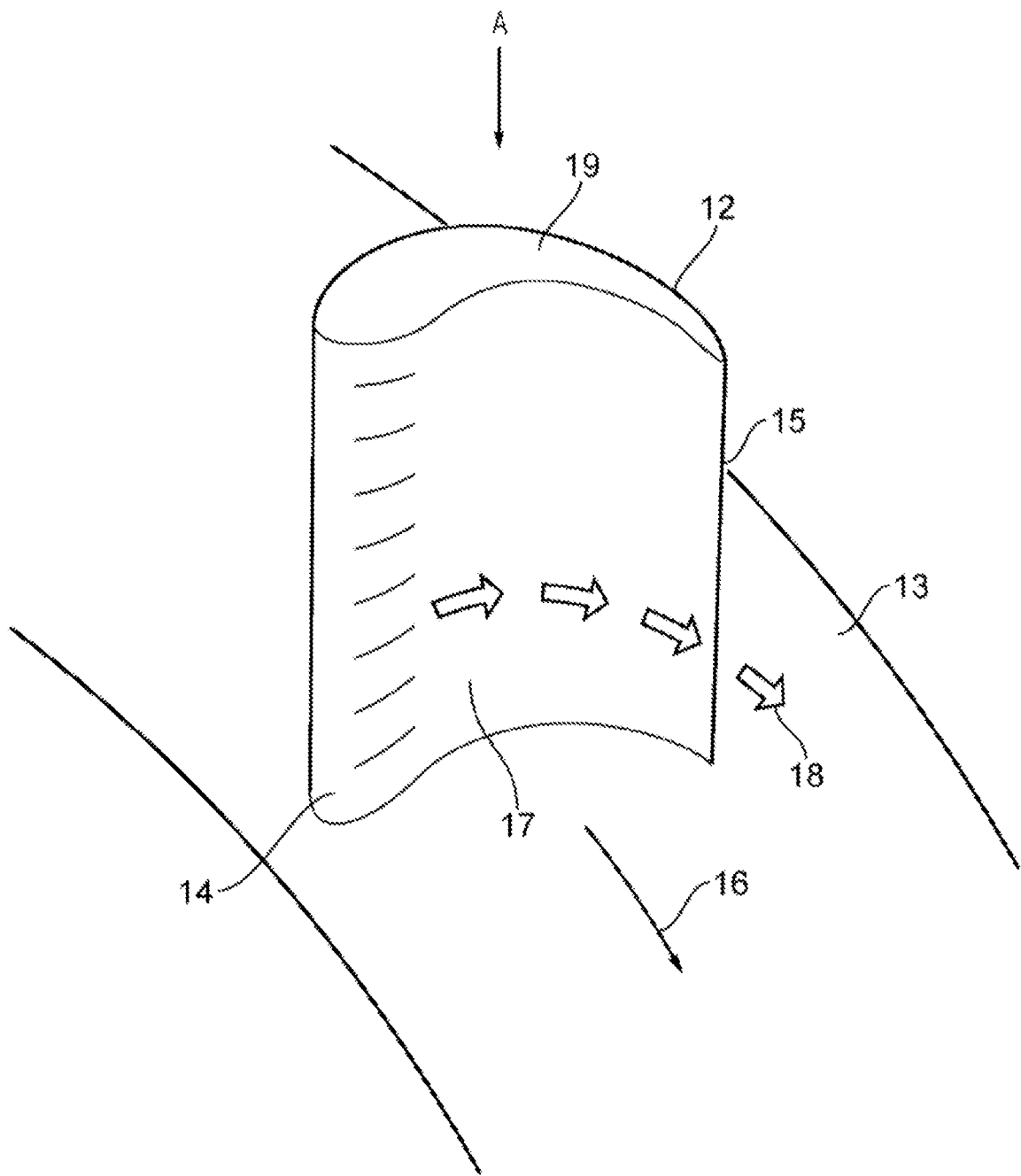
FIG. 2 shows schematic of a single compressor blade.

FIG. 2 is an exaggerated schematic of a single compressor blade 12 located on a hub 13. Each blade comprises a leading edge 14 and a trailing edge 15. Only a single blade is shown but it will be appreciated that each hub 13 comprises a plurality of circumferentially located and radially extending blades.

The hub rotates in the direction shown by arrow 16 and air impinges on the leading edge 14 and is directed along the pressure surface 17 towards the trailing edge 15 (the opposing side of the blade is termed the suction surface of the blade). Airflow is illustrated by arrow series 18.

As the hub and blade rotate so too does the distal end 19 of each blade in a circumferential path around the hub (and within the compressor casing which is not shown). The tips of the blades may move between speeds that are sub-supersonic up to speeds that are at or close to supersonic speed, this is known as transonic. It will be recognised that although the revolutions per minute (RPM) of the blade will be uniform along the radial length of the blade the instantaneous tangential rotational speed increases with increasing radius to the tip of the blade which is travelling at the highest rotational speed.

As discussed above, the schematic shown in FIG. 2 is highly exaggerated in terms of the curvature of blade. In fact, the blades may appear to be almost straight.

The reason the blades are conventionally straight is that this shape provides for the greatest efficiency at high speed and therefore the greatest fuel economy during cruise. This leads to a preferred straight blade. Conversely, the optimal design for aerodynamic stability is a more curved shape, particularly towards the trailing edge. This leads to a preferred curved blade.

Conventionally, designers must compromise and select an appropriate position between straight and curved to optimise engine operation during flight.

However, as described herein the present inventors have devised a configuration which benefits from both arrangements while continuing to operate efficiently.

This is illustrated with reference to FIG. 3.

Figure 3:
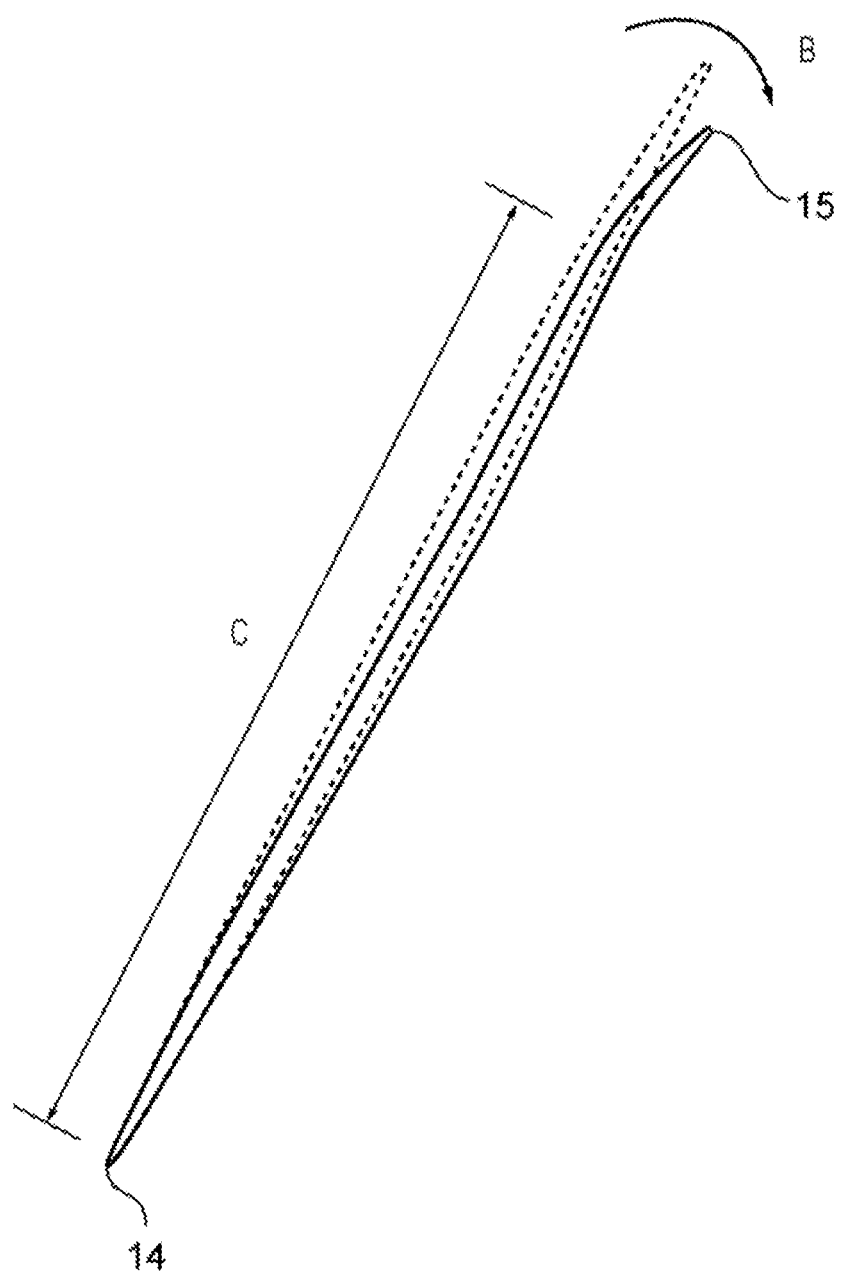
FIG. 3 shows two configurations of compressor blade viewed radially inwards.

FIG. 3 shows two compressor profiles when viewing the blade radially inwards i.e. in the direction shown by reference A in FIG. 2.

The dotted profile indicates a high efficiency blade profile and the solid line indicates a high aerodynamically stable blade profile. As shown, the optimal design for cruise is a generally straight profile extending outwards from the hub. An optimal design for stability is more curved as shown by arrow B. In a stability optimised profile the section of the blade C extending from the leading edge 14 to the trailing edge 15 is substantially straight and the trailing edge profile is curved, as illustrated by the straight and curved profile of the solid lined blade in FIG. 3.

As discussed above the inventors have established that it is possible to combine the two profiles to achieve the benefits of both high stability and high efficiency simultaneously. This is shown in FIG. 4.

Figure 4:
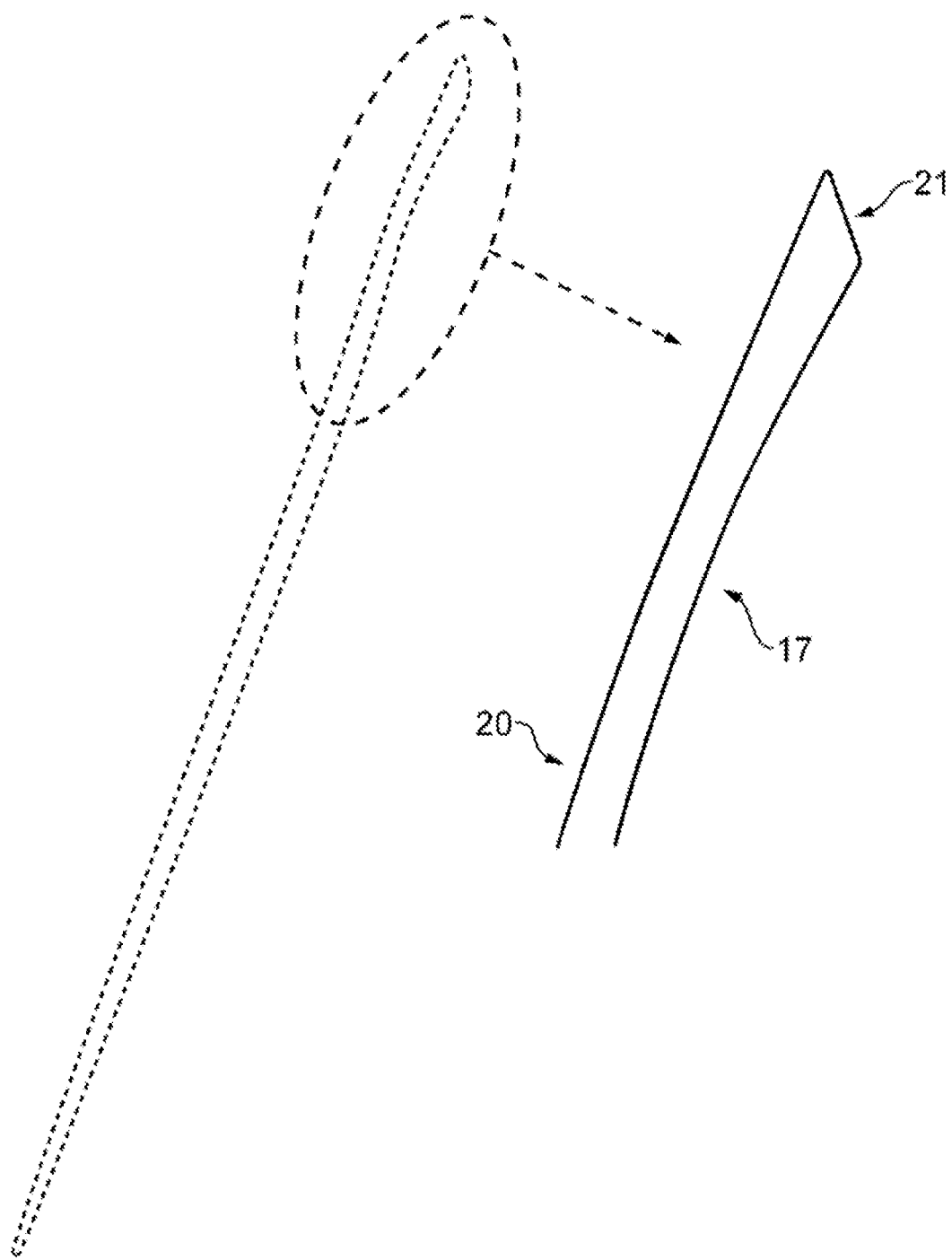
FIG. 4 shows a tip portion of a compressor blade incorporating optimised pressure and suction surfaces.

FIG. 4 shows a hybrid compressor blade design which has a modified tip or trailing edge. Specifically, both the pressure side 17 and suction side 20 are modified according to the optimal profile for stability and efficiency.

This is achieved by allowing the suction side profile to follow the optimal shape according to the profile shown in FIG. 3 (the dotted line). Simultaneously, the opposing pressure side of the blade is provided with a profile which is curved according to the optimal stability profile (corresponding to the solid line shown in FIG. 3).

Such a configuration has been found to provide an optimised blade design operable over a wide range of engine speeds from taxi to cruise and offering improved fuel efficiency.

Additionally, because aerodynamic limitations can be taken into consideration without having to compromise because of the efficiency requirements, the compressor can be adapted to operate at lower speed without stall and this may then negate the need for bleed valves within the transition duct or compressor inlet. This can substantially reduce the complexity and weight of the core of the engine with numerous associated advantages.

However, as also illustrated in FIG. 4, the profile of the trailing edge of the blade cannot have a conventional sharp or convergent profile of pressure side and suction side. Instead because of the different profiles of pressure and suction sides a thicker portion 21 acts as the distal trailing edge of the blade.

FIG. 4 illustrates how the hybrid blade surfaces terminate at the trailing edge of the blade. In effect the surface extending between edge defining the trailing edge of the suction surface and the edge defining the trailing edge of the pressure surface defines a third trailing edge surface or tip 21. As shown a thicker tip 21 is formed as a result of the two profiles. This tip forms the (third) trailing edge of the blade. The trailing edge surface extends radially from the hub to the most distal part of each blade and extends circumferentially between the trailing edge of the pressure surface and the trailing edge of the suction surface. This trailing edge profile is described further below.

Providing each compressor blade with a pressure surface, optimised for aerodynamic stability, and a suction surface, optimised for efficiency, provides a number of technical advantages including, but not limited to:

Potential to negate the need for air bleed systems;
Potential to negate the need for complex variable vanes;
An improvement in fuel efficiency
Improved reliability and simpler maintenance; and
Simplified manufacture.

However, it has also been established that while the hybrid blades can provide many technical advantages, the resulting configuration of the trailing edge as shown in FIG. 4 may create a detrimental aerodynamic effect in the form of vortices.

Figure 5:
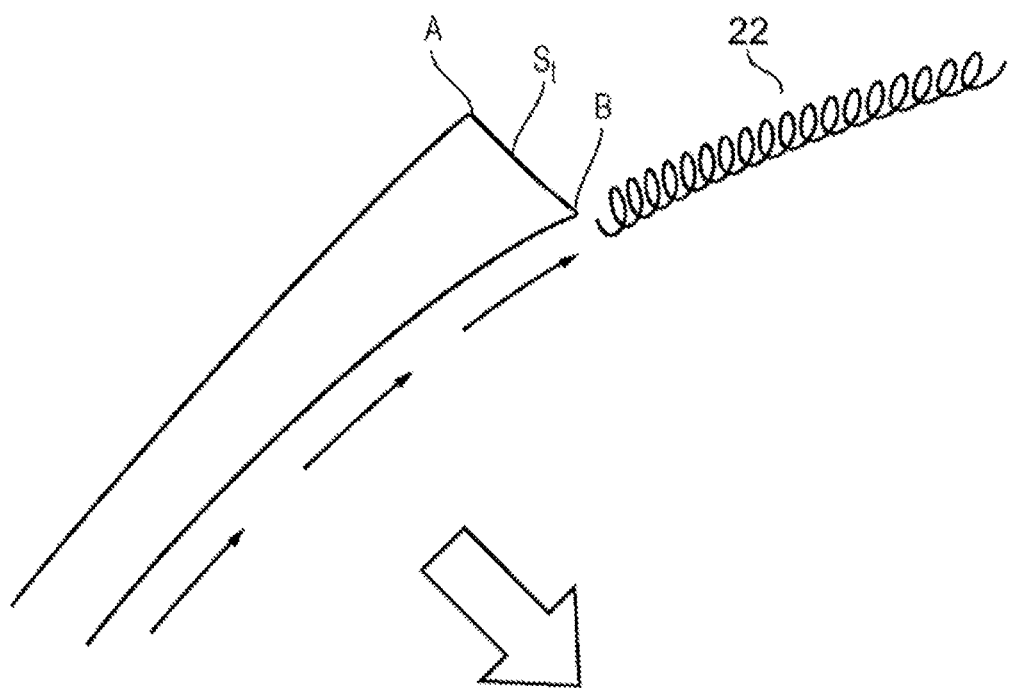
FIG. 5 illustrates vortex generation and shedding from a modified compressor blade as described herein.

FIG. 5 shows a first embodiment of a hybrid blade according to the present disclosure.

Referring to FIG. 5, the airflows over the blade can be seen. As described above the surface of the trailing edge St must extend between the end of the suction surface A to the end of the pressure surface B. This creates an unconventional thick trailing edge surface St.

The inventors have established that high velocity air leaving the trailing edge of the blade creates vortices 22 as shown in FIG. 5.

The creation, and more specifically shedding, of the vortices at the trailing edge causes pressure losses in the compressor which is undesirable since this in detrimental to compressor (and therefore engine) efficiency.

The inventors have however established a way of addressing this technical problem created by the trailing edge profile St. Addressing the issue of vortex generation and shedding further improves the efficiency of a blade and compressor described herein. Thus, the combination of the hybrid blade surfaces and modified trailing edge provide substantial technical advantages over existing compressor technology.

The modified trailing edge will now be described, starting with reference to FIGS. 6A and 6B.

FIGS. 6A and 6B illustrate a conventional compressor blade trailing edge and one arrangement of trailing edge according to an disclosure described herein respectively. The views shown in FIGS. 6A and 6B correspond to an axial view along the compressor from rear to aft i.e. a view of the downstream end of the compressor looking forwards toward the air inlet.

As shown in FIG. 6A a conventional compressor blade has a largely uniform shape. That is to say that the trailing edge extends from the hub 13 radially outwards towards the outer casing 23. The tip 21 is shown with a radial space between the inner surface of the outer compressor housing and the tip of the blade.

In the conventional blade the trailing edges of the pressure surface P and suction surface S converge at a central line $PS_C$ as illustrated in FIG. 6A. This is a sharp termination of the two surfaces intermediate between the suction and pressure surfaces.

FIG. 6B shows one configuration of a modified trailing edge of the hybrid blade the inventors have established. As shown, the trailing edge is much thicker for the reasons described above and is devoid of the convergence line $PS_C$ shown in FIG. 6A. Instead, the trailing edge surface St is defined between the ends of the pressure surface P and suction surface S as described above.

In order to address the problems created by the surface St (as illustrated in FIG. 5) the trailing edge of the blade is provided with an alternating profile which alternates in direction between the pressure side of the blade and the suction side of the blade. In effect, an undulating or serpentine shape may be provided for the trailing edge of the blade. In one example the profile may be a sinusoidal shape.

In FIG. 6B the alternative profile extends from the hub all the way to the tip. However, the undulations may be more severe or concentrated at the most radial part of each blade.

Providing the trailing edge with an undulating profile, as shown in FIG. 6B, causes a corresponding undulation of the trailing edge of the pressure and suction surfaces. This in turn creates different starting positions for vortex shedding on each surface measured in an airflow direction. By spreading out, or distributing, the start positions of each of the vortices the vortices are caused to interact and mix as they leave the trailing edge of the blade. This advantageously causes blending of the vortices in a destructive manner thereby reducing the effect of the vortex shedding on pressure loss. In effect the vortices are blended to reduce their effect and to return them to a more normal linear airflow. In effect, energy is re-distributed within the airflow. Specifically, vortex shedding occurs at one specific frequency, but the present arrangement acts to suppress this and the energy is re-distributed to other frequencies. The specific frequency will change depending on speed, and the effect of the sinusoidal shape described herein provides optimal performance effects at aircraft cruise conditions.

The alternating profile may be any suitable shape depending on the particular compressor and engine.

In one arrangement, as shown in FIG. 6B, the undulating profile may extend along the entire radial length of the blade from the hub 13 to the tip 21. Vortex shedding can then be suppressed along the full radial length of the blade.

However, it has been established that the generation of vortices is related to airspeed and consequently there is greater vortex generation towards the tip of the blade. More specifically, it is also the case that the difference between the pressure side and the suction side is the largest at the tip, which also means that the trailing edge thickness is thickest at the tip—as such the vortex shedding should be highest there compared to the hub.

In another arrangement only a portion of the radial length of the blade may be provided with an undulating trailing edge, as illustrated in FIG. 6C. Here only the most radial hatched portion of the blade trailing edge is provided with the undulating configuration. The root portion (toward the hub 13) has a straight profile.

It has been established that the point at which the undulations should start i.e., the blade radius at which they should start is a specific location for optimal performance, $r_b$. This should correspond to the radial distance at which the airflow becomes transonic i.e the radius at which the air over the blade reaches Mach 1.

The radius $r_{vs}$ of when the vortex shedding profile should be introduced i.e., when the undulations should start, is at a radius $r_b$ when $V_c$ approaches or is equal to Mach 1. This is in a cruise mode of flight for the aircraft. The point at which $V_c$ approaches or is equal to Mach 1 can be determined through aerodynamic modelling.

By mixing the vortices the cumulative turbulence at the trailing edge reduces and the overall pressure loss reduces. Thus, in combination with the modified hybrid pressure and suction surface profiles of the compressor blade, a highly advantageous blade can be produced for a given engine application.

FIG. 7 illustrates example profiles of trailing edges of a hybrid blade described herein.

A further modification may be applied to the trailing edge in a longitudinal direction as illustrated in FIG. 8. The view in FIG. 8 shows a side projection of a blade with leading edge 14 on the left and trailing edge 15 on the right. As shown the trailing edge profile may also be modified from root (proximate the hub) to a radially distal top of each blade and simultaneously in an airflow or chord-wise direction of the blade. Thus, a complex profile may be generated comprising undulations, such as sinusoidal profiles in a circumferential direction across the blade trailing edge and a chord-wise direction of the trailing edge. The profile may be selected depending on specific engine and compressor characteristics. In the examples shown the radial distance at which vortex shedding is required is denoted by radius $r_b$.

The combination of modified trailing edge in two planes creates a complex trailing edge surface which causes vortex shedding at many varied positions both radially and circumferentially. It will be recognised from the teaching herein that the precise shape can be optimised using modelling for a given engine and its desired operating characteristics.

Each blade may be provided with the same modified profile radially and circumferentially but it will also be recognised that adjacent blades or groups of blades may have different and non-uniform trailing edge profiles. In effect, an almost random blend of vortices may advantageously be created at the trailing edges of the blade. Pressure losses can thereby be advantageously minimised. In effect the vortices are blended or mixed to create a more uniform pressure after the trailing edge.

FIGS. 9A and 9B show an alternative embodiment of a hybrid blade according to the present disclosure. In this embodiment, the thick trailing edge described above with reference to the first embodiment can be avoided.

Specifically, in this embodiment the surface St of the trailing edge that extended between the trailing edge of the pressure surface P and the suction surface S is merged. More specifically, a normal sharp convergence of the trailing edge of the pressure surface and the trailing edge of the suction surface is provided which itself undulates between the line A indicating the extremity of the suction surface which is optimised for efficiency and line B which is optimised for stability (see FIG. 5A). This is illustrated in FIG. 9A by dotted lines A and B.

Again, the radial distance at which the undulations are introduced into the trailing edge design is $r_b$.

FIG. 9B is an end view of the trailing edge of the blade illustrated in FIG. 9A. The undulating surface commences at a radius of $r_b$ from the hub and has a pressure surface optimised for stability and a suction side optimised for efficiency. The trailing edges of the pressure and suction surfaces converge along the profile shown.

FIGS. 10A and 10B illustrate example mathematically correct descriptions of how to go about programming the morphing between the ideal shape of the 'best efficiency' blade and the 'best part speed' blade. By combining the two mathematical profiles together and commencing the undulation at the position described above the advantages of the disclosure can be realised.

Any disclosure described herein may be used in both high pressure and low pressure compressor blades.

The invention claimed is:

1. An apparatus, comprising a compressor blade for a compressor, the blade configured to extend radially from a central hub of the compressor, and comprising:
a pressure surface on one side of the blade and a suction surface on an opposing side of the blade;
wherein the pressure surface and the suction surface extend from a common leading edge of the blade to a suction surface trailing edge and a pressure surface trailing edge, and wherein the trailing edges of the pressure surface and suction surface of the blade are joined by a third trailing edge surface, wherein a portion of the third trailing edge surface of the blade alternates between a first circumferential direction and a second opposing circumferential direction when measured along the radius of the blade, forming an undulating profile having a plurality of peaks and valleys, the plurality of peaks and valleys having non-uniform frequency along the blade.

2. The apparatus of claim 1, wherein the third trailing edge surface includes a boundary defined between the hub end of the blade to a tip of the blade, and from the trailing edge of the pressure surface to the trailing edge of the suction surface.

3. The apparatus of claim 1, wherein the length of the suction surface measured from the leading edge to the suction surface trailing edge is greater than the length of the pressure surface measured from the leading edge to the pressure surface trailing edge.

4. The apparatus of claim 1, wherein the third trailing edge surface has a uniform thickness measured in a circumferential direction between the trailing edge of the suction side and the trailing edge of the pressure side.

5. The apparatus of claim 1, wherein the leading edge of the pressure surface intersects smoothly with the leading edge of the suction surface to define a smooth curved leading edge surface of the blade.

6. The apparatus of claim 5, wherein the pressure surface extending from the smooth leading edge has a curvature to cause air to leave the pressure surface trailing edge in a first direction; and the suction surface extending from the smooth leading edge has a curvature to cause air to leave the suction surface trailing edge in a second direction.

7. The apparatus of claim 1, wherein a portion of the third trailing edge surface has a sinusoidal profile when measured along the radius of the blade.

8. The apparatus of claim 1, wherein the third trailing edge profile comprises:
a first straight portion extending radially from the hub; and
a second alternating portion extending from the intersection of the first and second portions towards the tip of the blade.

9. The apparatus of claim 8, wherein the intersection of the first and second portions is at a predetermined radius measured from the hub of the blade.

10. The apparatus of claim 9, wherein the predetermined radius corresponds to a radius at which airflow across the pressure surface of the blade in a high power mode of operating the compressor reaches Mach 1.

11. The apparatus of claim 1, wherein the undulating profile is uniform in amplitude measured from a datum passing radially along the blade.

12. The apparatus of claim 1, wherein the undulating profile is non-uniform in amplitude measured from a datum passing radially along the blade.

13. The apparatus of claim 1, wherein the third trailing edge surface is flat.

14. The apparatus of claim 1, further comprising a gas turbine engine comprising the compressor, the compressor including a plurality of compressor blades including the compressor blade.

15. The apparatus of claim 14, further comprising an aircraft comprising the gas turbine engine.

16. The apparatus of claim 1, wherein:
the surface profile of the pressure surface of the blade is shaped according to a predetermined profile providing a predetermined aerodynamic stability; and
the surface profile of the suction surface of the blade is shaped according to a predetermined profile providing a predetermined fuel efficiency.

17. A compressor blade for a compressor, the blade configured to extend radially from a central hub of the compressor, and comprising:
a pressure surface on one side of the blade and a suction surface on an opposing side of the blade, wherein the pressure surface and suction surface extend from a common leading edge of the blade to a suction surface trailing edge and a pressure surface trailing edge;
wherein the trailing edges of the pressure surface and suction surface intersect to form a single trailing edge and wherein a portion of the intersecting trailing edges have a circumferentially oscillating profile extending radially along the blade, wherein a portion of the third trailing edge surface of the blade alternates between a first circumferential direction and a second opposing circumferential direction when measured along the radius of the blade, forming an undulating profile having a plurality of peaks and valleys, the peaks and valleys having non-uniform frequency along the blade.

18. The compressor blade of claim 17, wherein:
the surface profile of the pressure surface of the blade is shaped according to a predetermined profile providing a predetermined aerodynamic stability; and
the surface profile of the suction surface of the blade is shaped according to a predetermined profile providing a predetermined fuel efficiency.

* * * * *